United States Patent
Milne et al.

(10) Patent No.: US 12,244,572 B2
(45) Date of Patent: Mar. 4, 2025

(54) CLIENT-SIDE ENCRYPTION OF CONTENT FOR VIRTUAL MEETINGS

(71) Applicants: SONY GROUP CORPORATION, Tokyo (JP); Sony Interactive Entertainment LLC, San Mateo, CA (US)

(72) Inventors: James R. Milne, Ramona, CA (US); Charles McCoy, San Diego, CA (US); True Xiong, San Diego, CA (US)

(73) Assignees: SONY GROUP CORPORATION, Tokyo (JP); SONY INTERACTIVE ENTERTAINMENT INC., San Mateo, CA (US)

( * ) Notice: Subject to any disclaimer, the term of this patent is extended or adjusted under 35 U.S.C. 154(b) by 346 days.

(21) Appl. No.: 17/667,826

(22) Filed: Feb. 9, 2022

(65) Prior Publication Data
US 2023/0254291 A1  Aug. 10, 2023

(51) Int. Cl.
*H04L 9/40* (2022.01)
*H04L 65/403* (2022.01)

(52) U.S. Cl.
CPC ........ *H04L 63/0428* (2013.01); *H04L 65/403* (2013.01)

(58) Field of Classification Search
CPC ............... H04L 63/0428; H04L 65/403; H04L 65/1083; H04L 9/14
See application file for complete search history.

(56) References Cited

U.S. PATENT DOCUMENTS

| 6,049,878 A * | 4/2000 | Caronni ................ H04L 63/065 380/279 |
| 9,369,462 B2 * | 6/2016 | Grosskopf .............. G06F 40/40 |
| 9,591,479 B1 * | 3/2017 | Leavy ................... H04L 9/0833 |

(Continued)

FOREIGN PATENT DOCUMENTS

| CN | 113141484 A * | 7/2021 |
| EP | 3364330 B1 | 3/2021 |

OTHER PUBLICATIONS

Asor, et al., "client-side file security in cloud (storage) computing using encryption", International Conference on Information Technology and Economic Development, vol. 3, Jul. 2016, 15 pages.

(Continued)

*Primary Examiner* — Richard G Keehn
(74) *Attorney, Agent, or Firm* — CHIP LAW GROUP

(57) ABSTRACT

An electronic device and method for client-side encryption for virtual meetings is provided. The electronic device acquires one or more encryption keys for a virtual meeting session with one or more participant devices, where the electronic device includes a meeting client to join or host the virtual meeting session and to communicate with meeting clients of the one or more participant devices. The electronic device determines, in a duration of the virtual meeting session, first content to be transferred to the one or more participant devices, via the meeting client of the electronic device. The electronic device encrypts the determined first content by use of the one or more encryption keys and transfers the encrypted first content to a meeting server. The meeting server transfers the encrypted first content to the one or more participant devices.

19 Claims, 8 Drawing Sheets

(56) References Cited

U.S. PATENT DOCUMENTS

| | | | | |
|---|---|---|---|---|
| 11,100,197 | B1* | 8/2021 | Bernardi | H04L 9/14 |
| 11,921,888 | B2* | 3/2024 | Ren | G06F 16/9027 |
| 2006/0063594 | A1* | 3/2006 | Benbrahim | G07F 17/3223 |
| | | | | 463/42 |
| 2006/0095376 | A1* | 5/2006 | Mitchell | G06Q 10/10 |
| | | | | 705/50 |
| 2014/0208418 | A1* | 7/2014 | Libin | G06F 21/6209 |
| | | | | 726/19 |
| 2015/0281185 | A1* | 10/2015 | Cooley | H04L 63/0428 |
| | | | | 713/171 |
| 2016/0112377 | A1* | 4/2016 | Stover | H04L 51/222 |
| | | | | 713/168 |
| 2020/0089509 | A1* | 3/2020 | Arya | G06F 9/4482 |
| 2020/0228973 | A1* | 7/2020 | Kasabwala | H04L 9/0861 |
| 2021/0279780 | A1* | 9/2021 | Herken | H04L 63/0428 |
| 2022/0377056 | A1* | 11/2022 | Chawla | H04L 9/088 |
| 2023/0281883 | A1* | 9/2023 | Chan | H04L 12/1827 |
| | | | | 345/634 |

OTHER PUBLICATIONS

Thota, et al., "Split key management framework for Open Stack Swift object storage cloud", CSI Transactions on ICT, vol. 5, No. 4, Apr. 2017, 13 pages.

Blum Josh et al:"E2E Encryption for Zoom Meetings Contents", Dec. 15, 2020 (Dec. 15, 2020), pp. 1-55, XP055946502, Retrieved from the Internet: URL: https://github.com/zoom/zoom-e2e-whitepaper/raw/master/archive/zoom_e2e_v3.pdf [retrieved on Jul. 26, 2022]the whole document.

* cited by examiner

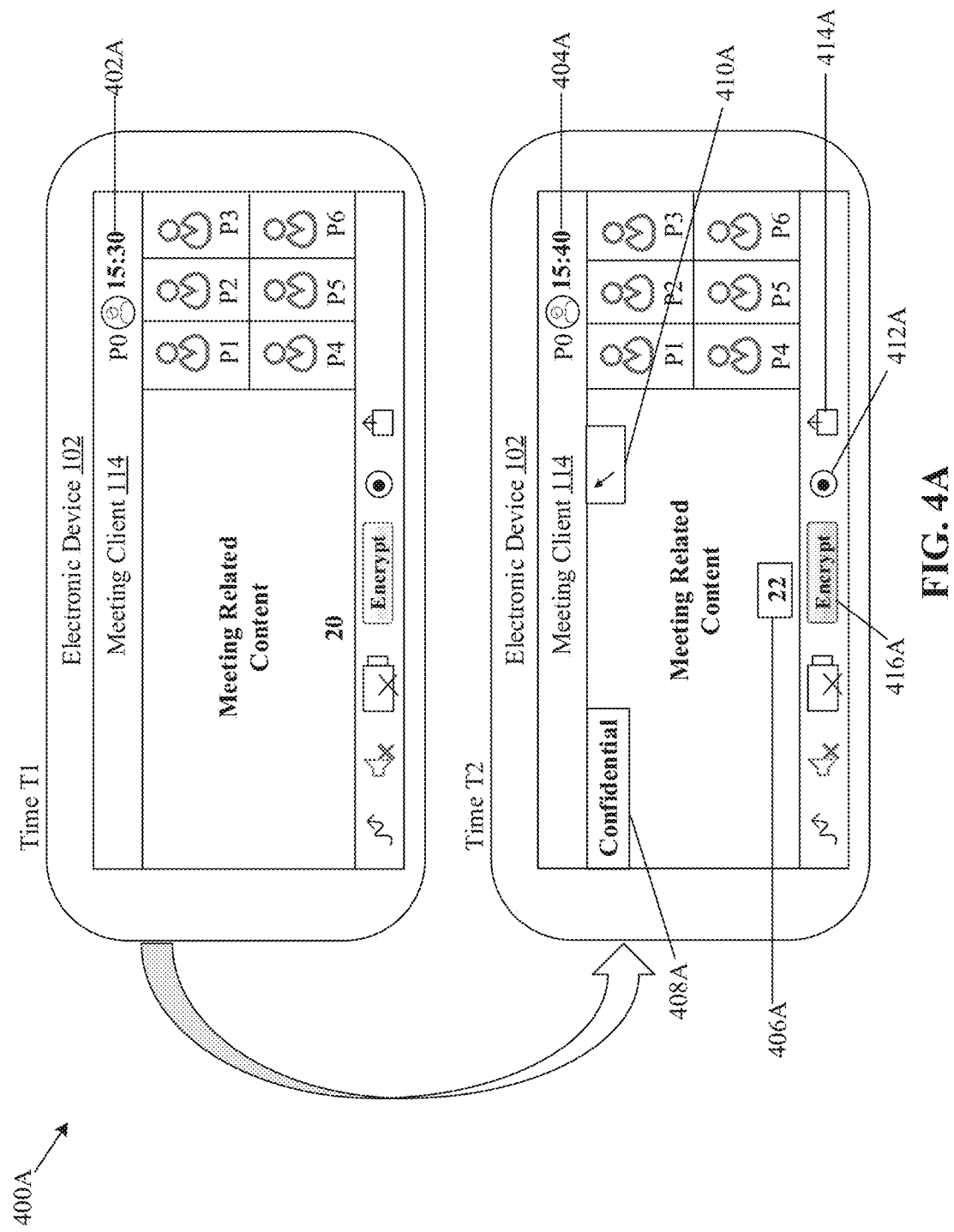

CLIENT-SIDE ENCRYPTION OF CONTENT FOR VIRTUAL MEETINGS

REFERENCE

None.

FIELD

Various embodiments of the disclosure relate to Internet technology and communication. More specifically, various embodiments of the disclosure relate to an electronic device and a method for client-side encryption of content related to virtual meetings.

BACKGROUND

Advancements in the field of information and communication technology have led to development of various virtual meeting services and applications. These virtual meeting services and applications enable two or more devices to join and exchange content or information in a virtual meeting session. For example, in a typical virtual meeting, the content or information, to be exchanged, is encrypted on server-side. For example, a server may provide a virtual meeting service or a server-side application to handle encryption of content associated with the virtual meeting. Confidentiality and/or integrity of the content exchanged during a virtual meeting session may depend on encryption policies or encryption methodologies adopted at the server-side. In some instances, the server or anyone with access to the server can access the content or information exchanged by the two or more devices. The content may be vulnerable to breach of confidentiality and/or integrity, particularly if the server is compromised.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for client-side encryption of content for virtual meetings, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 4A is a diagram that illustrates an exemplary scenario for client-side encryption of content for virtual meetings, in accordance with an embodiment of the disclosure.

DETAILED DESCRIPTION

The following described implementations may be found in the disclosed electronic device and method for client-side encryption of content related to virtual meetings. Exemplary aspects of the disclosure provide an electronic device (for example, a mobile phone, a desktop, a laptop, a smart television, a video conferencing system, and the like). For a virtual meeting session with one or more participant devices, the electronic device may acquire one or more encryption keys. The electronic device may include a meeting client that may facilitate a participant associated with the electronic device to join or host the virtual meeting session and to communicate with respective meeting clients of the one or more participant devices. The electronic device may determine, in a duration of the virtual meeting session, content to be transferred to the one or more participant devices, via the meeting client of the electronic device. The electronic device may encrypt the determined first content using the one or more acquired encryption keys and may transfer the encrypted content to a meeting server. The meeting server associated with the meeting client of the electronic device may transfer the encrypted content to the one or more participant devices.

Conventionally, in a virtual meeting session, content or information to be transferred to one or more participant devices of the virtual meeting session may be transferred to a meeting server associated with the virtual meeting application. The content may be encrypted between the client and the meeting server and/or on the meeting server (i.e., a server-side encryption) based on encryption policies and methodologies adopted by the meeting server. In contrast, the disclosed electronic device and method may enable encryption of content associated with a virtual meeting session on client-side (e.g., on the electronic device) prior to transfer of the content to the one or more participant devices. Since the content to be transferred is encrypted on the electronic device (client side), it may not be feasible for any unauthorized or unauthenticated devices to access, without decryption keys, the content on any meeting-related device, such as the meeting server or the electronic device.

In a case in which all participants of the virtual meeting session are part of an organization, the ability to have client-side encryption of the content may allow the organization to select encryption policies that meet the information security guidelines of the organization. The security of the transferred content may not rely on the encryption policies or encryption methodologies adopted by the meeting server, as done conventionally. This may improve the trust of participants of the virtual meeting session on a provider of the virtual meeting session and on meeting clients used to share or exchange data during the virtual meeting session.

Figure 1:
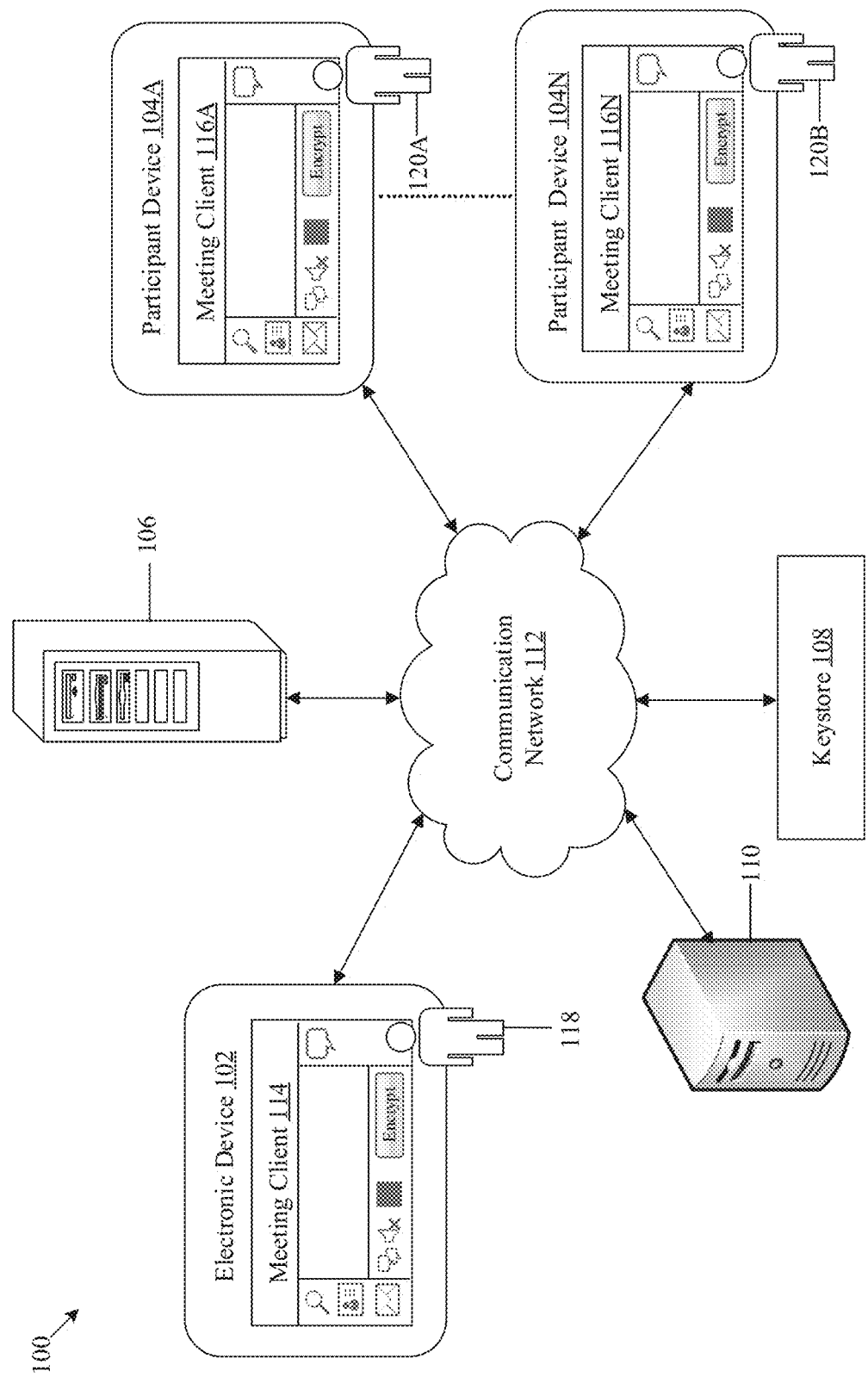
FIG. 1 is a diagram that illustrates an exemplary network environment for client-side encryption of content related to virtual meetings, in accordance with an embodiment of the disclosure.

FIG. 1 is a diagram that illustrates an exemplary network environment for client-side encryption of content related to virtual meetings, in accordance with an embodiment of the disclosure. With reference to FIG. 1, there is shown a network environment 100. The network environment 100 includes an electronic device 102, one or more participant devices 104A . . . 104N, a meeting server 106, a key store 108, and a $3^{rd}$ party server 110. The electronic device 102 may communicate with devices such as the one or more participant devices 104A . . . 104N, the meeting server 106, the key store 108, or the $3^{rd}$ party server 110, through one or more networks (such as a communication network 112). The electronic device 102 may include a meeting client 114 that may allow the electronic device 102 to join or host a virtual meeting session with the one or more participant devices 104A . . . 104N. The one or more participant devices 104A . . . 104N may include one or more meeting clients 116A . . . 116N. The one or more meeting clients 116A . . . 116N may allow the one or more participant devices 104A . . . 104N to join or host the virtual meeting session. There is shown a user 118 (a host or a participant of the virtual meeting) who may be associated with the electronic device 102. There is further shown one or more participants 120A . . . 120N associated with the one or more participant devices 104A . . . 104N.

The electronic device 102 may include suitable logic, circuitry, interfaces, and/or code that may be configured to schedule, join, or initiate virtual meeting session(s) by use of the meeting client 114. The meeting client 114 may enable on-device (i.e., client-side) encryption of content for the virtual meeting session(s). Examples of the electronic device 102 may include, but are not limited to, a computing device, a desktop, a personal computer, a laptop, a computer workstation, a display monitor or a computer monitor, a tablet, a smartphone, a cellular phone, a mobile phone, a consumer electronic (CE) device having a display, a television (TV), a wearable display, a head mounted display, a digital signage, a digital mirror (or a smart mirror), a video wall (which consists of two or more displays tiled together contiguously or overlapped in order to form one large screen), or an edge device connected to a user's home network or an organization's network.

The one or more participant devices 104A . . . 104N may include suitable logic, circuitry, and interfaces that may be configured to schedule, join, or initiate virtual meeting session(s) by use of the meeting clients 116A . . . 116N. The meeting clients 116A . . . 116N may enable on-device (i.e., client-side) encryption of content for the virtual meeting session(s). Similar to the electronic device 102, examples of a participant device of the one or more participant devices 104A . . . 104N may include, but are not limited to, a computing device, a desktop, a personal computer, a laptop, a computer workstation, a display monitor or a computer monitor, a tablet, a smartphone, a cellular phone, a mobile phone, a CE device having a display, a TV, a wearable display, a head mounted display, a digital signage, a digital mirror (or a smart mirror), a video wall (which consists of two or more displays tiled together contiguously or over- lapped in order to form one large screen), or an edge device connected to a user's home network or an organization's network.

The meeting server 106 may include suitable logic, circuitry, interfaces, and/or code that may be configured to render various services related to virtual meeting session(s). For example, such services may include a server-enabled communication between meeting client across devices, a feature that allows the meeting server 106 to support virtual meeting sessions at the same time, an option to record meeting content, an option to generate transcripts, an option to encrypt meeting-related content on the meeting server 106, a receive encrypted first content and encrypted bitstreams, an option to share files, and the like. The meeting server 106 may execute operations through web applications, cloud applications, HTTP requests, repository operations, file transfer, and the like. Examples of implementations of the meeting server 106 may include, but are not limited to, a database server, a file server, a web server, an application server, a mainframe server, a cloud computing server, or a combination thereof.

In at least one embodiment, the meeting server 106 may be implemented as a plurality of distributed cloud-based resources by use of several technologies that are well known to those ordinarily skilled in the art. A person with ordinary skill in the art will understand that the scope of the disclosure may not be limited to the implementation of the meeting server 106 and the electronic device 102 (or each of the one or more participant devices 104A . . . 104N) as two separate entities. In certain embodiments, the functionalities of the meeting server 106 can be incorporated in its entirety or at least partially in the electronic device 102 (or the one or more participant devices 104A . . . 104N), without a departure from the scope of the disclosure.

The key store 108 may include suitable logic, interfaces, and/or code that may be configured to store a plurality of encryption keys for encryption of content associated with the electronic device 102 and the one or more participant devices 104A . . . 104N. The key store 108 may be further configured to store a plurality of decryption keys for decryption of encrypted content associated with the electronic device 102 and the one or more participant devices 104A . . . 104N. In accordance with an embodiment, the plurality of encryption keys and the plurality of decryption keys may be associated with a plurality of organizations.

The key store 108 may be stored or cached on device(s), such as a server or an electronic device/system. In some cases, the key store 108 may be maintained on a network that may be managed by an organization. In such cases, the encryption or decryption keys in the key store 108 may be reserved for devices managed by the organization. The device(s) storing the key store 108 may be configured to receive a request for one or more encryption keys or one or more decryption keys from the electronic device 102 (or the one or more participant devices 104A . . . 104N). The request may include information, such as user credentials, a meeting ID, a device ID, or an authentication token. The device(s) storing the key store 108 may be configured to validate the request and then provide the one or more encryption keys or decryption keys to the electronic device 102 or the one or more participant devices 104A . . . 104N based on validation. In some embodiments, the key store 108 may store information pertaining to the participants (the participant 118 and the one or more participants 120A . . . 120N) invited to join the virtual meeting session. The key store 108 may communicate with the meeting server 106 to obtain the information, if the information about the participants is not available in the key store 108. The information may enable the key store 108 to verify that the request for the one or more encryption keys for the virtual meeting session has been received from a participant invited to join the virtual meeting session.

In some embodiments, the key store 108 may be a distributed ledger. The distributed ledger may be a decentralized and distributed database system that may maintain an immutable record of data operations or transactions. The set of data operations may be grouped together as a block and may be further linked to a previous block of data operations to form a chain of a plurality of blocks. All blocks of data operations may be stored in a decentralized manner, whereby all participants or nodes store all the plurality of blocks. Further, the distributed ledger may include one or more data blocks which may store the plurality of encryption keys and the plurality of decryption keys. One or more nodes may execute one or more signed transactions received from the electronic device 102 or the one or more participant devices 104A . . . 104N to extract the one or more encryption keys of the plurality of encryption keys or the one or more decryption keys of the plurality of decryption keys.

In some embodiments, the key store 108 may be hosted on a plurality of servers at the same or different locations. The operations of the key store 108 may be executed using hardware including a processor, a microprocessor (e.g., to perform or control performance of one or more operations), a field-programmable gate array (FPGA), or an application-specific integrated circuit (ASIC). In some other instances, the key store 108 may be implemented using a software.

The $3^{rd}$ party server 110 may include suitable logic, circuitry, interfaces, and/or code that may be configured to receive a record of meeting audio associated with a virtual meeting session from the electronic device 102 or the one or more participant devices 104A . . . 104N. The $3^{rd}$ party server 110 may be further configured to receive a request from the electronic device 102 or the one or more participant devices 104A . . . 104N, to provide a transcript of the meeting audio. The $3^{rd}$ party server 110 may generate a transcript of the meeting audio and may send the generated transcript to the electronic device 102 or the one or more participant devices 104A . . . 104N. The $3^{rd}$ party server 110 may be implemented as a cloud server and may execute operations through web applications, cloud applications, HTTP requests, repository operations, file transfer, and the like. Other example implementations of the $3^{rd}$ party server 110 may include, but are not limited to, a web server, an application server, an API server, a mainframe server, or a cloud computing server.

In some embodiments, the electronic device 102 or a participant device of the one or more participant devices 104A . . . 104N may generate a transcript of the meeting audio. The transcript may be generated by usage of audio information provided during the virtual meeting session by a device generating the transcript (the electronic device 102 or the participant device), and audio information received from audio sources of other devices in the virtual meeting session. The generated transcript may be transmitted as encrypted meeting metadata to the meeting server 106.

In some embodiments, one or more participant devices (the electronic device 102 and the one or more participant devices 104A . . . 104N) may generate the transcript of audio information originating from one or more audio sources of the one or more participant devices, while one or more other participants may send audio information, originating from one or more other audio sources to the $3^{rd}$ party server 110. In some instances, the $3^{rd}$ party server 110 may generate meta-data other than transcript information from meeting content, such as thumbnail images of video content, bookmarks of occurrence of events (such as beginning of content sharing, or analysis of a meeting chat channel, shared whiteboard, and so on).

In at least one embodiment, the $3^{rd}$ party server 110 may be implemented as a plurality of distributed cloud-based resources by use of several technologies that are well known to those ordinarily skilled in the art. A person with ordinary skill in the art will understand that the scope of the disclosure may not be limited to the implementation of the $3^{rd}$ party server 110 and the electronic device 102 or each of the one or more participant devices 104A . . . 104N, as two separate entities. In certain embodiments, the functionalities of the $3^{rd}$ party server 110 can be incorporated in its entirety or at least partially in the electronic device 102 or the one or more participant devices 104A . . . 104N, without a departure from the scope of the disclosure.

The communication network 112 may include a communication medium through which the electronic device 102, the one or more participant devices 104A . . . 104N, the meeting server 106, the key store 108, and the $3^{rd}$ party server 110, may communicate with each other. The communication network 112 may be a wired or wireless communication network. Examples of the communication network 112 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The meeting client 114 may be a software executable on the electronic device 102 or may be accessible via a web client installed on the electronic device 102. The meeting client 114 may enable the participant 118 to join, schedule, communicate, exchange information with other participants of a virtual meeting session in a virtual environment. Examples of the virtual meeting session that may be organized using the meeting client 114 may include, but are not limited to, a web conference, an audio conference, an audio-graphic conference, a video conference, a live video, a podcast session with multiple speakers, and a video call. In some instances, the virtual meeting session may be a video conference in which game-related content (such as game-play or game review) can be shared with game consoles used by game developers.

Each of the one or more meeting clients 116A . . . 116N may be the same as the meeting client 114. Therefore, a detailed description of the one or more meeting clients 116A . . . 116N has been omitted from the disclosure for the sake of brevity.

In operation, the electronic device 102 may be configured to detect a user input or an event to enable client-side encryption for virtual meetings. The electronic device 102 may trigger one or more operations for client-side encryption for virtual meetings based on the detection of the user input or the event.

In an embodiment, the electronic device 102 may include a computer-executable program to detect the user input and/or the event. The computer-executable program may be interfaced with the meeting client 114 and/or other applications (such as an email client and a calendar application) that require meeting details. Examples of the interface may include, but are not limited to, a software plugin and an application programming interface (API). The electronic device 102 may perform the one or more operations to obtain content (such as content presented during the virtual meeting session, an audio recording of the virtual meeting session, a transcript of the virtual meeting session, or a text exchanged between participants of the virtual meeting session) generated inside the meeting client 114 via the computer-executable program.

The electronic device 102 may acquire one or more encryption keys for the virtual meeting session with the one or more participant devices 104A . . . 104N. Such keys may be acquired prior to the initiation of the virtual meeting session. Examples of the one or more encryption keys may include public-private keys (asymmetric cryptography), session-specific encryption keys, temporal encryption keys, or a combination thereof. A session-specific encryption key may be used to encrypt meeting-related content generated in a specific virtual meeting session. A temporal encryption key may remain valid for encryption up to a specific period, such as for one or more hours, a day, a week, or a duration of the session. A content-specific encryption key may be used to encrypt specific type of content such as a record of meeting audio, a transcript of the meeting audio, a presentation, and a text file. A user-specific encryption key may be used for encrypting content to be sent to a specific participant of the virtual meeting. The electronic device 102 may acquire the or more encryption keys from the key store 108. The key store 108 may be associated with an organization and the participant 118 and the one or more participants 120A . . . 120N may be members of the organization. The details of acquisition of the one or more encryption keys for the virtual meeting session are described, for example, in FIG. 3.

In a duration of the virtual meeting session, the electronic device 102 may determine first content to be transferred to the one or more participant devices 104A . . . 104N, via the meeting client 114 of the electronic device 102. In accordance with an embodiment, the electronic device 102 may analyze meeting-related content associated with the virtual meeting session and may detect an event in the duration of the virtual meeting session based on analysis of the meeting-related content. The first content may correspond to one or more portions of the meeting-related content. The details of determination of the first content to be transferred in the duration of the virtual meeting session are described, for example, in FIGS. 3, 4A, and 4B.

The electronic device 102 may encrypt the determined first content by use of the acquired one or more encryption keys. For example, the electronic device 102 may employ key based encryption techniques such as data encryption standard (DES), advanced encryption standard (AES), Rivest, Shamir, Adleman (RSA), and the like to encrypt the first content. After the encryption, the electronic device 102 may be configured to transfer the encrypted first content to a meeting server 106. In some embodiments, different encryption keys may be utilized for encrypting different portions of the first content, such as audio, video, shared content, meeting chat, or content from a particular participant (participant 118 or the one or more participants 120A . . . 120N). In some cases, the first content may be encrypted with different encryption keys based on some attribute of the first content, such as a security level designation. Upon reception, the meeting server 106 may transfer the encrypted first content to the one or more participant devices 104A . . . 104N.

Figure 2:
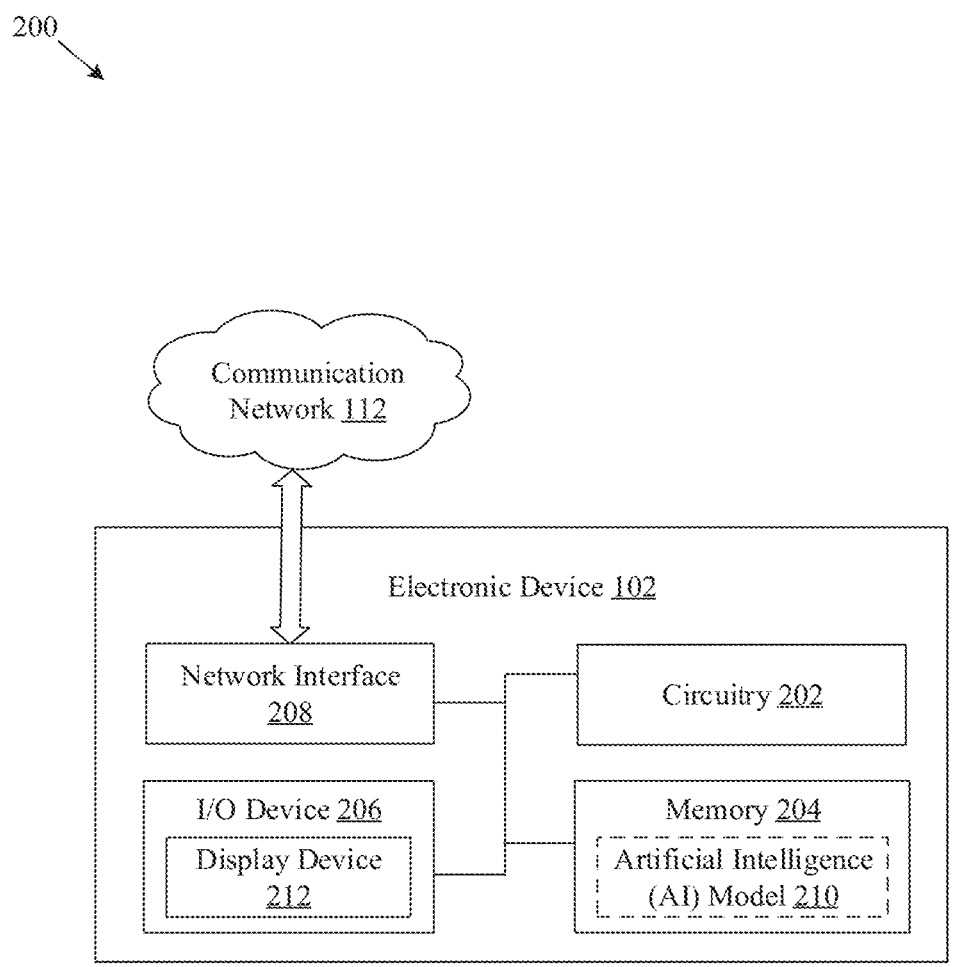
FIG. 2 is a block diagram that illustrates an exemplary electronic device for client-side encryption of content to be exchanged during virtual meetings, in accordance with an embodiment of the disclosure.

FIG. 2 is a block diagram that illustrates an exemplary electronic device for client-side encryption of content to be exchanged during virtual meetings, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the memory 204 may also include an artificial intelligence (AI) model 210. In at least one embodiment, the I/O device 206 may also include a display device 212. The circuitry 202 may be communicatively coupled to the memory 204, the I/O device 206, and the network interface 208, through wired or wireless communication of the electronic device 102.

The circuitry 202 may include suitable logic, circuitry, and interfaces that may be configured to execute program instructions associated with different operations to be executed by the electronic device 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The memory 204 may be configured to also store the AI model 210. In at least one embodiment, the memory 204 may store the one or more encryption keys acquired by the electronic device 102, the one or more decryption keys acquired by the electronic device 102, bitrate-specific versions of the first content, the record the meeting audio, and a received transcript of the recorded meeting audio. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive user inputs from the participant 118 to trigger initiation of execution of program instructions, by the circuitry 202, associated with different operations to be executed by the electronic device 102. Examples of the I/O device 206 may include, but are not limited to, a touch screen, a keyboard, a mouse, a joystick, a microphone, the display device 212, and a speaker.

The I/O device 206 may include the display device 212. The display device 212 may include suitable logic, circuitry, and interfaces that may be configured to receive inputs from the circuitry 202 to render, on a display screen, content of the meeting client 114. Examples of the content of the meeting client 114 may include, but not related to, meeting-related content, a chat box, and a User Interface (UI). The display screen may further render an event on the rendered content of the meeting client 114. In an embodiment, the event that may be detected by the AI model 210. In another embodiment, the event that may be detected based on one or more user inputs from the participant 118 and the one or more participant devices 104A . . . 104N. The UI may receive the one or more user inputs from the participant 118 or the one or more participant devices 104A . . . 104N, that allows determination of the first content from the rendered content of the meeting client 114 (meeting-related content). The display screen may be a touch screen which may enable a user to provide a user-input via the display device 212 or the display screen. The touch screen may be at least one of a resistive touch screen, a capacitive touch screen, or a thermal touch screen. The display device 212 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202 and the meeting server 106, via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CO-DEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The functions or operations executed by the electronic device 102, as described in FIG. 1, may be performed by the circuitry 202. Operations executed by the circuitry 202 are described in detail, for example, in FIGS. 3, 4A, 4B, 5, and 6.

Figure 3:
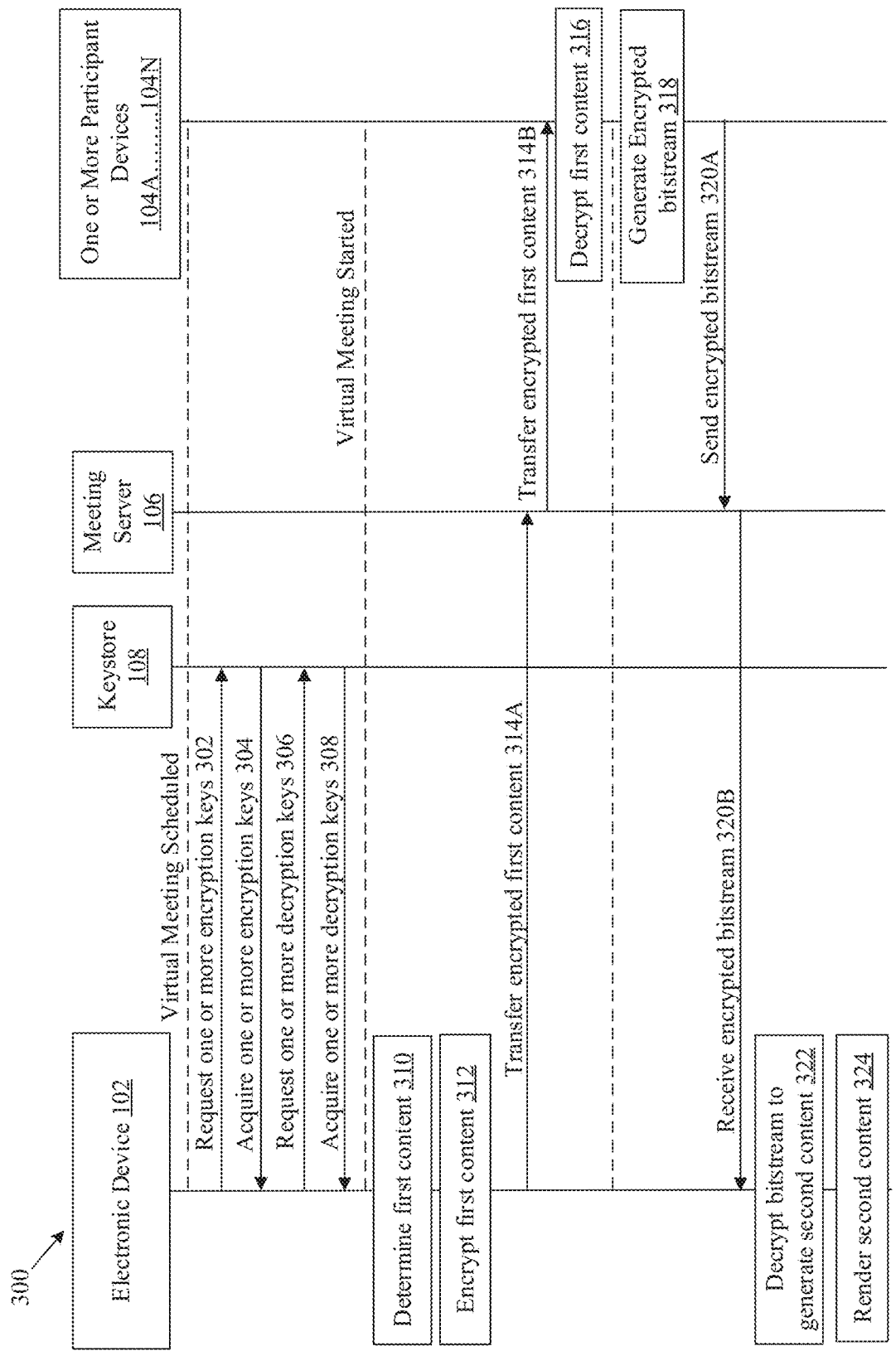
FIG. 3 is an exemplary sequence diagram that illustrates client-side encryption and client-side decryption of content by the electronic device of FIG. 2, in accordance with an embodiment of the disclosure.

FIG. 3 is an exemplary sequence diagram that illustrates client-side encryption and client-side decryption of content by the electronic device of FIG. 2, in accordance with an embodiment of the disclosure. FIG. 3 is explained in conjunction with elements from FIG. 1 and FIG. 2. With reference to FIG. 3, there is shown exemplary sequence diagram 300. In the exemplary sequence diagram 300, there is shown one or more components of FIG. 1, such as the electronic device 102, the meeting server 106, the key store 108, and the one or more participant devices 104A . . . 104N. The electronic device 102 includes the meeting client 114, which enables the electronic device 102 to join or host the virtual meeting session. The electronic device 102, using the meeting client 114, may communicate with the one or more meeting clients 116A . . . 116N, included in the one or more participant devices 104A . . . 104N. The one or more components may execute a set of operations, such as operations 302, 304, 306, 308, 310, 312, 314A, 314B, 316, 318, 320A, 320B, 322, and 324. The operations from 302 to 308 may be executed prior to the initiation of the virtual meeting session. The operations from 310 to 324 may be executed after the initiation of the virtual meeting session. Alternatively, the operations from 316 to 324 may be executed after the initiation of another virtual meeting session, wherein the operations from 302 to 308 may be executed prior to the initiation of the other virtual meeting session.

In the sequence diagram 300, the set of operations may be performed by the electronic device 102 to perform client-side encryption and client-side decryption for virtual meetings, as described herein. In an embodiment, the electronic device 102 may trigger the set of operations based on a user input. The user input may be provided by the participant 118 via the meeting client 114 included in the electronic device 102. a participant of the one or more participants 120A . . . 120N may also provide the user input may, via a meeting client of the one or more meeting clients 116A . . . 116N (included in the one or more participant devices 104A . . . 104N). The participant 118 or the participant of the one or more participants 120A . . . 120N may act as a host or initiator of the virtual meeting session. In an embodiment, the electronic device 102 may trigger the set of operations based on detection of an event on the meeting client 114 or a meeting client of the meeting clients 116A . . . 116N. Examples of the event may include, but are not limited to, a detection of schedule of the virtual meeting session or a detection of a virtual meeting state as 'Active'.

At 302, one or more encryption keys may be requested. The electronic device 102 may be configured to transmit one or more requests to the key store 108 for acquisition of the one or more encryption keys. In an embodiment, the electronic device 102 may be configured to digitally sign each of the one or more requests prior to transmission of the one or more requests. The electronic device 102 may transmit the one or more digitally signed requests to the key store 108 to acquire the one or more encryption keys, which may be used to encrypt one or more portions of the meeting-related content to be transmitted to the one or more participant devices 104A . . . 104N. The key store 108 may be managed by an organization or a key issuing authority. The participant 118 and the one or more participants 120A . . . 120N (associated with the one or more participant devices 104A . . . 104N), may be associated with the organization or the key issuing authority.

In some embodiments, the key store 108 may confirm whether the electronic device 102 (requestor) is authorized to host (or attend) the virtual meeting session, prior to providing the one or more encryption keys. In some embodiments, the key store 108 may provide the one or more encryption keys to the electronic device 102 in an encrypted form. The electronic device 102 may require a root certificate to decrypt the encrypted one or more encryption keys received from the key store 108. The root certificate may be managed on one or more devices (such as computers) of the organization or the key issuing authority.

In some embodiments, the electronic device 102 (and the one or more participant devices 104A . . . 104N) may communicate with the key store 108 through the meeting server 106 (for example, a video server) to provide a public key, specific to the electronic device 102, in the one or more requests. The key store 108 may encrypt the one or more encryption keys (to be provided to the electronic device 102 in response to the one or more requests) for the virtual meeting session by use of the provided public key. The electronic device 102 may utilize a private key of the electronic device 102 to decrypt the encrypted one or more encryption keys. The decryption may allow the electronic device 102 to obtain the one or more encryption keys for the virtual meeting session.

In some embodiments, the one or more encryption keys for the virtual meeting session may be distributed outside of a video distribution system, such as in an invitation to the virtual meeting session sent through a channel other than the meeting server 106.

In an embodiment, the key store 108 may be a distributed ledger. The distributed ledger may comprise of a plurality of nodes. The electronic device 102 may be configured to transmit a signed transaction to the distributed ledger. The one or more requests may include the signed transaction.

At 304, the one or more encryption keys may be acquired. The electronic device 102 may be configured to acquire the one or more encryption keys, from the key store 108, for a virtual meeting session with the one or more participant devices 104A . . . 104N. The key store 108 may be configured to send the one or more encryption keys to the electronic device 102 upon successful authentication of the electronic device 102. In an embodiment, the key store 108 may authenticate the electronic device 102 if the key store 108 is able to successfully verify digital signatures of each of the one or more requests received by the electronic device 102. Similarly, the key store 108 may store one or more encryption keys for encryption of content that may be generated on the one or more participant devices 104A . . . 104N. The key store 108 may be configured to send one or more encryption keys to each of the one or more participant devices 104A . . . 104N upon successful authentication of (or verification of requests from) the one or more participant devices 104A . . . 104N.

In an embodiment, the electronic device 102 may generate a public encryption key and a private key. Similarly, each of the one or more participant devices 104A . . . 104N, may generate a corresponding public key and a private key. Thereafter, the electronic device 102 and each of the one or more participant devices 104A . . . 104N may send their respective public encryption keys to the key store 108. The key store 108 may store such keys for future key access requests.

The electronic device 102 may utilize the private key to digitally sign each of the one or more requests for the acquisition of one or more public encryption keys corresponding to the one or more participant devices 104A . . . 104N. The key store 108 may be configured to verify the signature of the one or more requests, based on a public key of the electronic device 102.

The one or more encryption keys acquired by the electronic device 102 may include one or more public encryption keys of the one or more participant devices 104A . . . 104N. The electronic device 102 may use a first public encryption key of the participant device 104A to encrypt portions of the meeting-related content to be transmitted to the participant device 104A. Similarly, the electronic device 102 may utilize a $N^{th}$ public encryption key of the participant device 104N to encrypt portions of the meeting-related content to be transmitted to the participant device 104N.

If the key store 108 is a distributed ledger, then the key store 108 may store the one or more encryption keys in a first block of data on the distributed ledger. The distributed ledger may execute the signed transaction, transmitted by the electronic device 102 (at 302), on one or more nodes associated with the distributed ledger. The signed transaction may be executed on the distributed ledger to extract the one or more encryption keys stored in the first block of data. The distributed ledger may be configured to send the one or more encryption keys to the electronic device 102 upon successful execution of the signed transaction. Similarly, the one or more participant devices 104A . . . 104N may request the distributed ledger for encryption keys by sending one or more signed transactions. The distributed ledger may execute the one or more signed transactions received from the one or more participant devices 104A . . . 104N. The one or more participant devices 104A . . . 104N may acquire the one or more encryption keys from the distributed ledger based on successful execution of the one or more signed transactions by the distributed ledger.

At 306, one or more decryption keys may be requested. The electronic device 102 may be configured to transmit one or more requests to the key store 108 for acquisition of the one or more decryption keys. The key store 108 may store the one or more decryption keys corresponding to the one or more participant devices 104A . . . 104N and such keys may be required for decryption of one or more encrypted bitstreams received from the one or more participant devices 104A . . . 104N. In an embodiment, the electronic device 102 may be configured to digitally sign each of the one or more requests prior to the transmission of such requests to the key store 108.

At 308, the one or more decryption keys may be acquired. The electronic device 102 may be configured to acquire the one or more decryption keys from the key store 108. Such keys may be utilized to decrypt one or more bitstreams received from the one or more participant devices 104A . . . 104N. For example, the key store 108 may be configured to send the one or more decryption keys to the electronic device 102 upon successful authentication of the electronic device 102. In an embodiment, the key store 108 may authenticate the electronic device 102 based on verification of the received one or more digitally signed requests using the public encryption key of the electronic device 102.

In accordance with an embodiment, the key store 108 may be configured to generate the one or more decryption keys for the electronic device 102. Additionally, the key store 108 may be configured to generate one or more decryption keys for each of the one or more participant devices 104A . . . 104N. When requested by the electronic device 102, the key store 108 may share with the electronic device 102, the one or more decryption keys generated for the electronic device 102. In such a case, the decryption key may be a private key of the electronic device 102. To share content of the virtual meeting session with the electronic device 102, each participant device may encrypt the content using a public key (i.e., the encryption key) of the electronic device 102. The electronic device may decrypt the encrypted content using its own private key (i.e., the decryption key). Similarly, the key store 108 may share with the respective one or more participant devices 104A . . . 104N, the generated one or more decryption keys for each of the one or more participant devices 104A . . . 104N.

In an embodiment, if the key store 108 is a distributed ledger, the key store 108 may store the one or more decryption keys in a second block of data on the distributed ledger. The electronic device 102 may acquire the one or more decryption keys from the second block of data on the distributed ledger. The one or more decryption keys may be acquired when the distributed ledger sends the one or more decryption keys upon reception of the one or more digitally signed requests from the electronic device 102.

In an embodiment, the electronic device 102 may be configured to acquire the one or more encryption keys and the one or more decryption keys from the key store 108 prior to the start of the virtual meeting session.

At 310, first content to be transferred to the one or more participant devices 104A . . . 104N may be determined. The electronic device 102 may be configured to determine, in a duration of the virtual meeting session, the first content to be transferred to the one or more participant devices 104A . . . 104N, via the meeting client 114 of the electronic device 102. The first content may be a portion of the meeting-related content shared during the virtual meeting session.

In an embodiment, the electronic device 102 may analyze the meeting-related content throughout the duration of the virtual meeting session and may detect the event based on the analysis of the meeting-related content. By way of example, and not limitation, the electronic device 102 may employ the AI model 210 to analyze the meeting-related content.

In an embodiment, the AI model 210 may be trained using a dataset of images. The images may include one or more indications such as numbers, watermarks, words, alphabets, arrows, symbols, and the like. The electronic device 102 may mark the one or more portions of the meeting-related content using one or more indications. The AI model 210 may detect such indications in the duration of the virtual meeting session. An event may be detected when the AI model 210 detects an indication on the meeting-related content, based on the analysis of frames of the meeting-related content rendered on the display device 212.

In another embodiment, the AI model 210 may be trained to recognize keywords in speech using a dataset that comprises keywords related to one or more topics of discussion of the virtual meeting session. The AI model 210 may be configured to analyze the speech of the participant 118 and the one or more participants 120A . . . 120N, to detect if the speech includes one or more keywords present in the dataset used for training the AI model 210. An event may be detected when the AI model 210 detects such keywords in the speech.

In another embodiment, the electronic device 102 may be configured to receive inputs from the participant 118 and one or more participants 120A . . . 120N. The electronic device 102 may detect the event based on received user inputs. The electronic device 102 may receive a user input from the participant 118 via the UI of the meeting client 114 rendered on the display device 212. Alternatively, the electronic device 102 may receive a user input from a participant via a UI of a meeting client of the one or more meeting clients 116A . . . 116N.

In another embodiment, the electronic device 102 may receive user inputs from the participant 118 and/or one or more participants 120A . . . 120N. Such inputs may indicate a timestamp that corresponds to an event to trigger the encryption of content. In another embodiment, the electronic device 102 may detect the event based on detection of a beacon, such as an ultrasonic or infrasonic beacon inserted in meeting audio.

The electronic device 102 may be configured to determine the rendered meeting-related content as the first content, based on the event. For example, if the meeting-related content is a slide of a presentation, the slide can be considered as a portion of the presentation. The electronic device 102 may detect the slide number rendered on the slide as part of the event (using the AI model 210, one or more user inputs, and/or the beacon). The electronic device 102 may determine the slide as the first content or the slide and one or more successive slides as the first content to be transferred to the one or more participant devices 104A . . . 104N via the meeting client 114 of the electronic device 102.

At 312, the determined first content may be encrypted. The electronic device 102 may encrypt the determined first content by use of the one or more acquired encryption keys. The detailed implementation of one or more encryption techniques used by the electronic device 102 to encrypt the determined first content may be known to one skilled in the art, and therefore, a detailed description of such techniques has been omitted from the disclosure for the sake of brevity.

At 314A, the encrypted first content may be transferred to the meeting server 106. The electronic device 102 may transfer the encrypted first content to the meeting server 106.

At 314B, the encrypted first content may be transferred to the one or more participant devices 104A . . . 104N. The meeting server 106 may transfer the encrypted first content to the one or more participant devices 104A . . . 104N. The detailed implementation of one or more techniques used by the electronic device 102 to transfer the encrypted first content to the meeting server 106, and the one or more techniques used by the meeting server 106 to transfer the encrypted first content to the one or more participant devices 104A . . . 104N may be known to one skilled in the art. Therefore, a detailed description of such techniques used by the electronic device 102 and the one or more techniques used by the meeting server 106, has been omitted from the disclosure for the sake of brevity.

At 316, the encrypted first content may be decrypted. The one or more participant devices 104A . . . 104N may decrypt the encrypted first content received from the meeting server 106. Each of the one or more participant devices 104A . . . 104N may be configured to decrypt using one or more decryption keys acquired from the key store 108 (like the acquisition of the one or more decryption keys by the electronic device 102 at 308). The detailed description of one or more techniques used by the one or more participant devices 104A . . . 104N, to decrypt the encrypted first content has been omitted from the disclosure for the sake of brevity.

At 318, an encrypted bitstream may be generated. At any time-instant in the duration of the virtual meeting session, a participant device of the one or more participant devices 104A . . . 104N may be configured to generate the encrypted bitstream. The participant device may be configured to determine content to be transmitted to the electronic device 102 (like the determination of the first content by the electronic device 102 at 310). The participant device may encrypt the determined content to generate the encrypted bitstream (like the encryption of the first content by the electronic device 102 at 312). In an embodiment, the participant device may be configured to encrypt the bitstream by use of the public encryption key of the electronic device 102. The public encryption key of the electronic device 102 may be acquired from the key store 108.

At 320A, the encrypted bitstream may be transferred to the meeting server 106. The participant device of the one or more participant devices 104A . . . 104N may transfer the encrypted bitstream to the meeting server 106.

At 320B, the encrypted bitstream may be transferred to the electronic device 102. The meeting server 106 may transfer the encrypted first content to the electronic device 102. The detailed implementation of one or more techniques used by the participant device of the one or more participant devices 104A . . . 104N to transfer the encrypted first content to the meeting server 106, and the one or more techniques used by the meeting server 106 to transfer the encrypted first content to the electronic device 102, may be known to one skilled in the art. Therefore, a detailed description of such techniques has been omitted from the disclosure for the sake of brevity.

At 322, the encrypted bitstream may be decrypted. The electronic device 102 may be configured to receive the encrypted bitstream from the participant device of the one or more participant devices 104A . . . 104N, in the duration of the virtual meeting session. The electronic device 102 may be configured to decrypt the received encrypted bitstream by use of the acquired one or more decryption keys (at 302) to output second content.

At 324, the second content may be rendered. The electronic device 102 may be configured to control the meeting client 114 of the electronic device 102 to render the second content on the display device 212.

FIG. 4A is a diagram that illustrates an exemplary scenario for client-side encryption of content for virtual meetings, in accordance with an embodiment of the disclosure. FIG. 4A is explained in conjunction with elements from FIG. 1, FIG. 2, and FIG. 3. With reference to FIG. 4A, there is shown an exemplary scenario 400A. In the exemplary scenario 400A, there is shown one or more components of FIG. 1, such as the electronic device 102 with a display (such as the display device 212) that includes the UI of the meeting client 114. It should be noted that the mobile phone or smart phone shown in FIG. 4A is presented merely as an example of the electronic device 102. The present disclosure may be also applicable to other types of the electronic device 102 such as a desktop, a laptop, a TV, a personal computer, and so.

The electronic device 102 may include the meeting client 114 to join or host a virtual meeting session and to communicate with the one or more meeting clients 116A . . . 116N of the one or more participant devices 104A . . . 104N. At any time-instant, the electronic device 102 or a participant device of the one or more participant devices 104A . . . 104N may share the presentation as part of meeting-related content in the virtual meeting session. The presentation may be rendered on the screen of the electronic device 102 and each of the one or more participant devices 104A . . . 104N. As shown, for example, the virtual meeting session may be attended by six participants viz., P1, P2, P3, P4, P5, and P6. The participant 118 associated with the electronic device 102 may be P0. The UI of the meeting client 114 may render elements that may be configured to receive user inputs. The UI elements include a first button used to perform annotations, a second button to indicate whether to enable or disable a camera of the electronic device 102, a third button to indicate whether to enable or disable a microphone of the electronic device 102, a fourth button 412A to initiate a recording of the virtual meeting session, a fifth button 414A to share one or more files (stored on the electronic device 102) with the one or more participant devices 104A . . . 104N, and a sixth button 416A to indicate the electronic device 102 to initiate encryption of meeting-related content rendered on the UI of the meeting client 114.

The UI of the meeting client 114 is shown at time instants T1 and T2. At T1, meeting-related content (for example, a presentation) may be displayed on the screen (or display device 212 associated with the electronic device 102) of the electronic device 102. At T1, i.e., at 15:30 402A, the electronic device 102 may control the meeting client 114 to render the slide #20 of the presentation on the UI of the meeting client 114.

At T2, i.e., at 15:40 404A, the electronic device 102 may control the meeting client 114 to render the slide #22 406A of the presentation on the UI of the meeting client 114. At T2, the electronic device 102 may be configured to initiate an encryption of the meeting-related content, i.e., the slide #22 406A, based on a detected event.

The electronic device 102 may be configured to detect the event in the duration of the virtual meeting session based on analysis of meeting-related content associated with the virtual meeting session. For example, the event may be detected at T2 (15:40 404A) when the slide #22 406A of the presentation is rendered. The electronic device 102 may be configured to determine, in the duration of the virtual meeting session (i.e., at T2), the first content to be transferred to the one or more participant devices 104A . . . 104N, via the meeting client 114 of the electronic device 102. The first content may be determined to be a portion of the meeting-related content and corresponds to the detected event. For example, the slide #22 406A of the presentation may be determined as the first content if the electronic device 102 is able to detect the event at T2 (15:40 404A). In some instances, one or more slides that may succeed the slide #22 406A may be included in the first content.

The event may correspond to one of an indication, a watermark, a keyword, a beacon, or a timestamp that may be included in the meeting-related content and may be rendered on the meeting client 114 of the electronic device 102. The electronic device 102 may utilize at least one of the indication, the watermark, the keyword, the beacon, or the timestamp to mark specific portions of the meeting-related content.

In an embodiment, the electronic device 102 may be configured to receive at least one input in the duration of the virtual meeting session via a UI element of the meeting client 114 and/or a participant device of the one or more participant devices 104A . . . 104N. The electronic device 102 may detect the event based on the at least one input.

In an embodiment, the event may be detected based on a user input via the fourth button 412A. The fourth button 412A may be selected by the participant 118 or the one or more participants 120A . . . 120N to initiate a recording of the virtual meeting session. The event may be detected further based on a user input via the fifth button 414A (i.e., a screenshare option). The event may be detected further based on a user input via the sixth button 416A (i.e., the "Encrypt" button). The user input may be provided by the participant 118 or the one or more participants 120A . . . 120N. The event may be detected further based on a user input via the or a combination of, the fourth button 412A, the fifth button 414A, and the sixth button 416A. In some instances, the event may be detected when one or more conditions are met. Such conditions may include, for example, a render of a specific slide (for example, the slide #22 406A) on the UI of the meeting client 114, a presence of a symbol (for example, the watermark 410A) on the meeting-related content (slide #22 406A), a presence of a keyword (for example, the keyword "Confidential" 408A) in the meeting-related content (slide #22 406A), and a detection of a specific timestamp (for example, the time instant T2 or 15:40 404A) in the duration of the virtual meeting session.

In another embodiment, the electronic device 102 may be configured to analyze the meeting-related content throughout the virtual meeting session by use of the AI model 210. The AI model 210 may analyze each frame rendered on the UI of the meeting client 114 during the virtual meeting session. The event may be detected based on the analysis of the slide #22 406A (of the meeting-related content) at T2. The AI model 210 may be trained using a dataset of images that include numbers, watermarks, words, alphabets, symbols, and the like.

If the relevant content is to be presented at the specific timestamp 15:40 404A, the electronic device 102 may use the AI model 210 to detect numbers 15 and 40 that represent the specific timestamp. The electronic device 102 may use the AI model 210 to also detect symbols such as arrows as watermarks or specific keywords. For example, if the slide #22 406A of the presentation includes the word "confidential", the electronic device 102 may use the AI model 210 to detect the word "confidential". As shown, for example, the slide #22 406A includes the slide number (#22), the watermark 410A, the keyword "Confidential" 408A, and the timestamp 15:40 404A. The trained AI model 210 may detect at least one of the slide number (#22), the watermark 410A, the keyword "Confidential" 408A, and the timestamp 15:40 404A, based on analysis of the at least one frame rendered on the UI of the meeting client 114 at T2.

The electronic device 102 may determine slide #22 406A and/or the one or more slides succeeding the slide #22 406A as the first content upon detection of the event at T2 (15:40 404A). Thereafter, the electronic device 102 may encrypt the first content rendered on slide #22 406A and may transmit the meeting-related content to the one or more participant devices 104A . . . 104N.

Figure 4B:
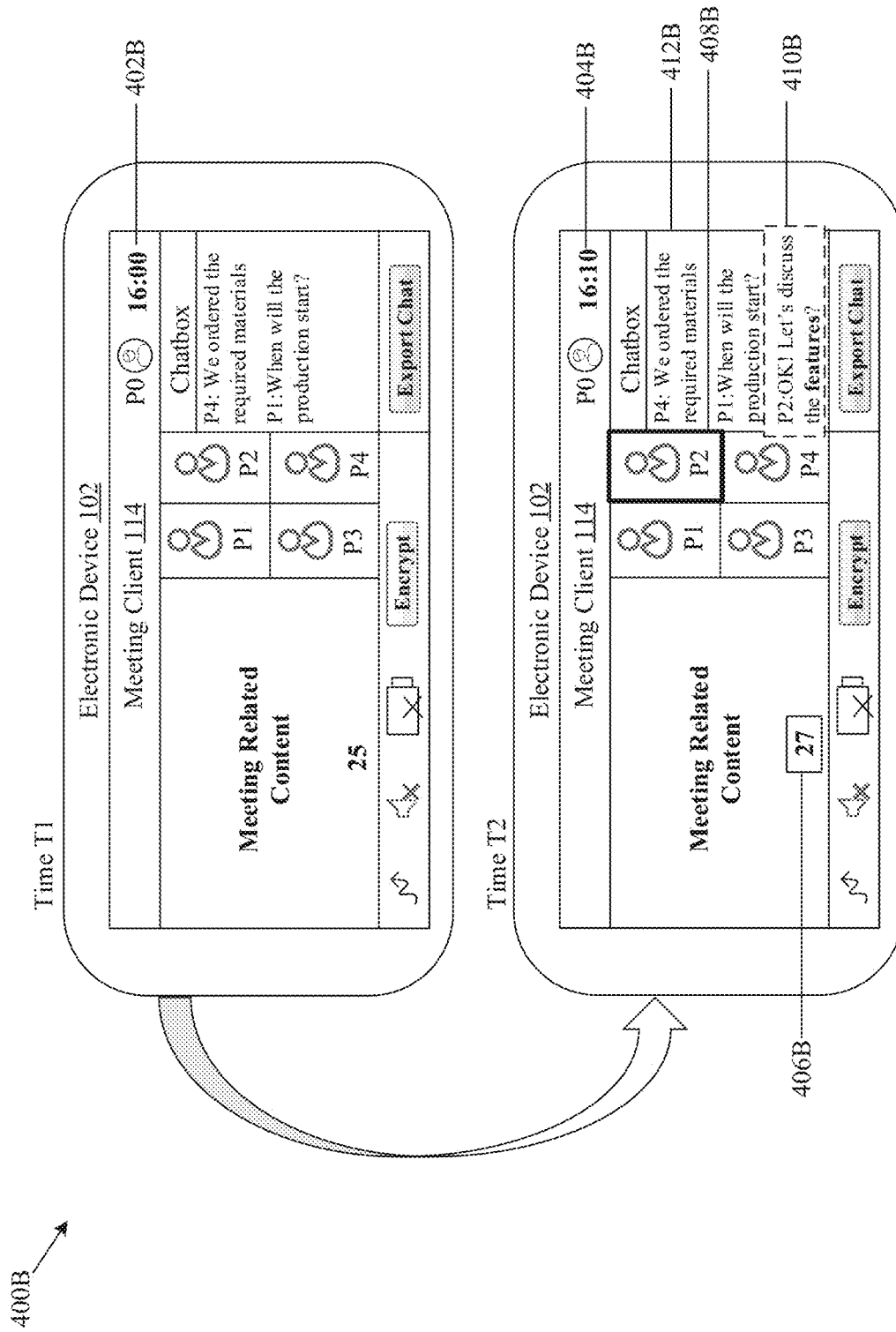
FIG. 4B is a diagram that illustrates an exemplary scenario for client-side encryption of content for virtual meetings by the electronic device of FIG. 2, in accordance with an embodiment of the disclosure.

FIG. 4B is a diagram that illustrates an exemplary scenario for client-side encryption of content for virtual meetings, in accordance with an embodiment of the disclosure. FIG. 4B is explained in conjunction with elements from FIG. 1, FIG. 2, FIG. 3, and FIG. 4A. With reference to FIG. 4B, there is shown an exemplary scenario 400B. In the exemplary scenario 400B, there is shown one or more components of FIG. 1, such as the electronic device 102 with the display (such as the display device 212) that includes the UI of the meeting client 114. The electronic device 102 may include the meeting client 114 to join or host a virtual meeting session and to communicate with the one or more meeting clients 116A . . . 116N of the one or more participant devices 104A . . . 104N. The virtual meeting session may be attended by four participants viz., P1, P2, P3, and P4. The participant 118 associated with the electronic device 102 may be P0. The UI of the meeting client 114 may render elements that may be configured to receive user inputs. The UI elements may include a first button to perform annotations, a second button to indicate whether to enable or disable a camera of the electronic device 102, a third button to indicate whether to enable or disable a microphone of the electronic device 102, and a fourth button to instruct the electronic device 102 to initiate encryption of meeting-related content rendered on the UI of the meeting client 114.

The UI of the meeting client 114 is shown at time instants T1 and T2. At T1, meeting-related content (for example, a presentation) and a chat box 412 that includes a conversation between the participants of the virtual meeting session may be displayed on a screen (e.g., the display device 212) of the electronic device 102. At T1, i.e., at 16:00 402B, the electronic device 102 may control the meeting client 114 to render slide #25 of the presentation on the UI of the meeting client 114. The chat box 412 may include a message received from the participant P4 and a message received from the participant P1. At T2, i.e., at 16:10 404B, the electronic device 102 may control the meeting client 114 to render slide #27 406B of the presentation on the UI of the meeting client 114. The chat box 412 may include a new message from the participant P2 in addition to the messages received from the participant P4 and the participant P1. At T2, the electronic device 102 may be configured to initiate an encryption of the meeting-related content, i.e., the slide #27 406B, based on a detection of an event. The event may be detected based on the new message received from the participant P2. The event may be detected at T2 (16:10 404B) when the slide #27 406B of the presentation is rendered and may correspond to a keyword included in the new message. For example, the keyword in the message may include a word "feature" related to a product in development. The detection may be performed based on application of the AI model 210 on text messages included in the chat box 412.

In an embodiment, the electronic device 102 may train the AI model 210 to detect specific keywords that may be present in the meeting-related content (e.g., slides of the presentation) or in one or more messages (text) included in the chat box 412. As an example, the electronic device 102 may train the AI model 210 to detect keywords that may be relevant to the topic of discussion during the virtual meeting session.

The electronic device 102 may be configured to determine, in the duration of the virtual meeting session (at T2), the first content to be transferred to the one or more participant devices 104A . . . 104N, via the meeting client 114 of the electronic device 102. The first content may be determined to be a portion of the meeting-related content and corresponds to the detected event. For example, the meeting-related content rendered on slide #27 406B and/or the one or more slides succeeding the slide #27 406B may be determined as the first content upon detection of the event at T2 (16:10 404B).

The electronic device 102 may encrypt the meeting-related content rendered on slide #27 406B and may transmit the encrypted content to the one or more participant devices 104A . . . 104N associated with the participants P1, P2, P3, and P4.

Figure 5:
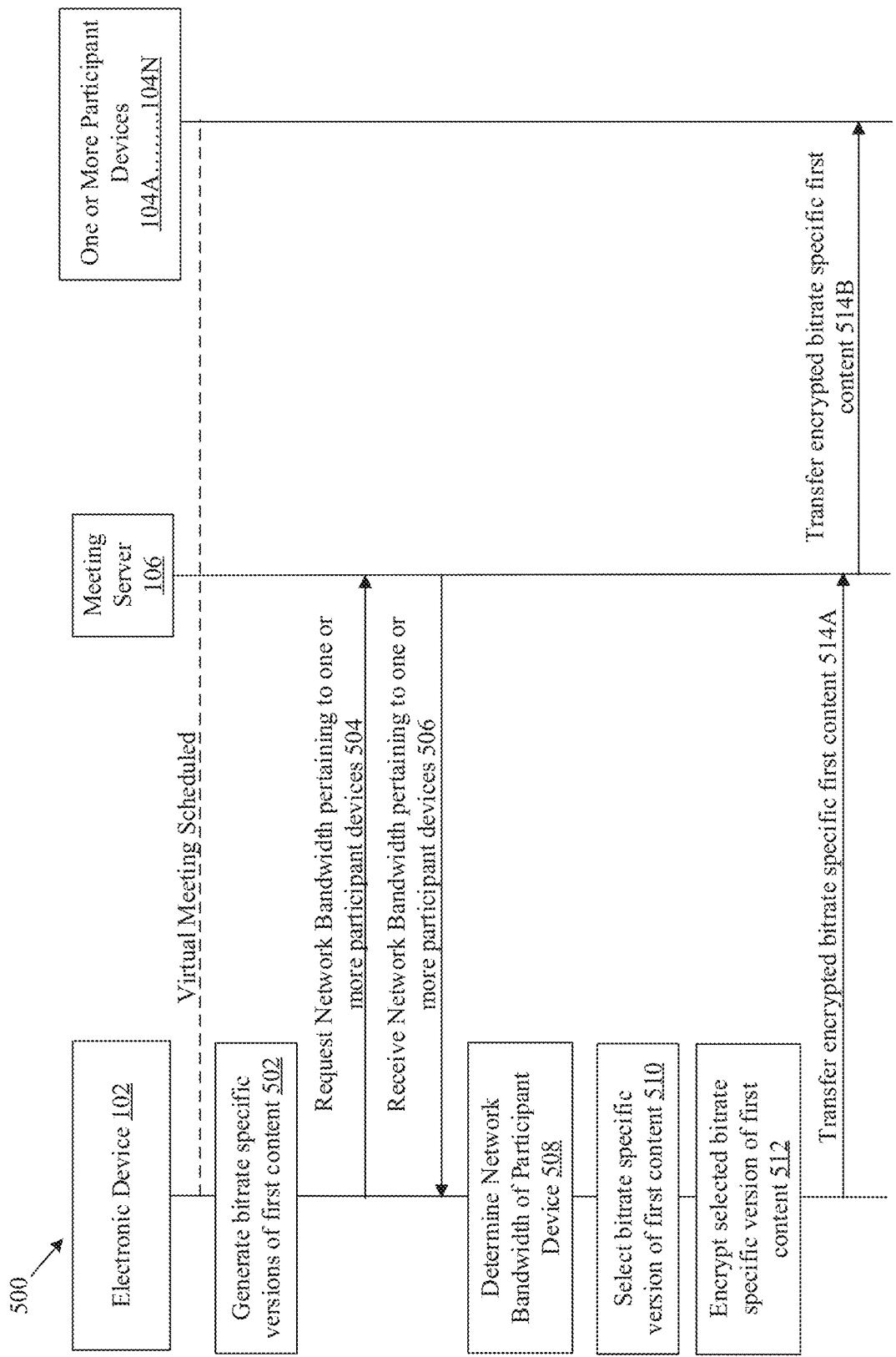
FIG. 5 is an exemplary sequence diagram that illustrates client-side encryption of a bitrate specific version of first content, in accordance with an embodiment of the disclosure.

FIG. 5 is an exemplary sequence diagram that illustrates client-side encryption of a bitrate specific version of first content, in accordance with an embodiment of the disclosure. FIG. 5 is explained in conjunction with elements from FIG. 1, FIG. 2, FIG. 3, FIG. 4A, and FIG. 4B. With reference to FIG. 5, there is shown an exemplary sequence diagram 500. In the exemplary sequence diagram 500, there is shown one or more components of FIG. 1, such as the electronic device 102, the meeting server 106, and the one or more participant devices 104A . . . 104N. In the exemplary sequence diagram 500, the electronic device 102 may execute a set of operations 502, 504, 506, 508, 510, 512, 514A, and 514B to encrypt bit-rate specific versions of the first content, as described herein.

At 502, bitrate-specific versions of the first content may be generated. The electronic device 102 may be configured to generate bitrate-specific versions of the first content. For example, if the first content is an audio portion of a meeting audio (media related content), the electronic device 102 may encode the first content at multiple bitrates to generate multiple bitrate-specific versions of the first content.

At 504, network bandwidth pertaining to the one or more participant devices 104A ... 104N of the virtual meeting session may be requested. The electronic device 102 may be configured to send one or more requests to the meeting server 106 to provide the network bandwidth pertaining to the one or more participant devices 104A ... 104N. In some instances, such requests may be periodically shared with the meeting server 106 to provide the network bandwidth pertaining to the one or more participant devices 104A ... 104N. The network bandwidth may depend on, for example, capabilities of a participant device to send and receive data, a network infrastructure and capability of a service provider that provides network connectivity services (for example, Internet) to the participant device, and an internet traffic load on the network of the participant device. In some instances, At 506, the network bandwidth pertaining to each of the one or more participant devices 104A ... 104N of the virtual meeting session may be received from the meeting server 106. The electronic device 102 may be configured to receive the network bandwidth pertaining to each of the one or more participant devices 104A ... 104N, in response to the one or more requests to the meeting server 106.

In an embodiment, the meeting server 106 may verify whether the received one or more requests have been sent by the electronic device 102. For example, the meeting server 106 may verify that the source of the received one or more requests is a trusted participant device, based on digital signatures associated with the received one or more requests. The verification may be performed by use of the public encryption key of the electronic device 102. If the verification is successful, the meeting server 106 may send the network bandwidth pertaining to the one or more participant devices 104A ... 104N to the electronic device 102.

At 508, a network bandwidth of the participant device of the one or more participant devices 104A ... 104N may be determined in the duration of the virtual meeting session. The electronic device 102 may be configured to determine the network bandwidth of the participant device from the network bandwidth received from the meeting server 106.

At 510, a bitrate specific version of the first content may be selected. The electronic device 102 may be configured to select the bitrate specific version of the first content from the generated bitrate specific versions, based on the determined network bandwidth of the participant device. The selected bitrate specific version may correspond to the network bandwidth of the participant device.

At 512, the selected bitrate specific version of the first content may be encrypted. The electronic device 102 may be configured to encrypt the selected bitrate specific version of the first content by use of the acquired one or more encryption keys. The details pertaining to the encryption of the first content and the acquisition of the one or more encryption keys are described, for example, in FIG. 3.

At 514A, the encrypted bitrate specific version of the first content may be transferred. The electronic device 102 may be configured to transfer the encrypted bitrate specific version of the first content to the meeting server 106.

At 514B, the encrypted bitrate specific version of the first content may be transferred to the participant device of the one or more participant devices 104A ... 104N. The meeting server 106 may transfer the encrypted bitrate specific version of the first content to the participant device.

Figure 6:
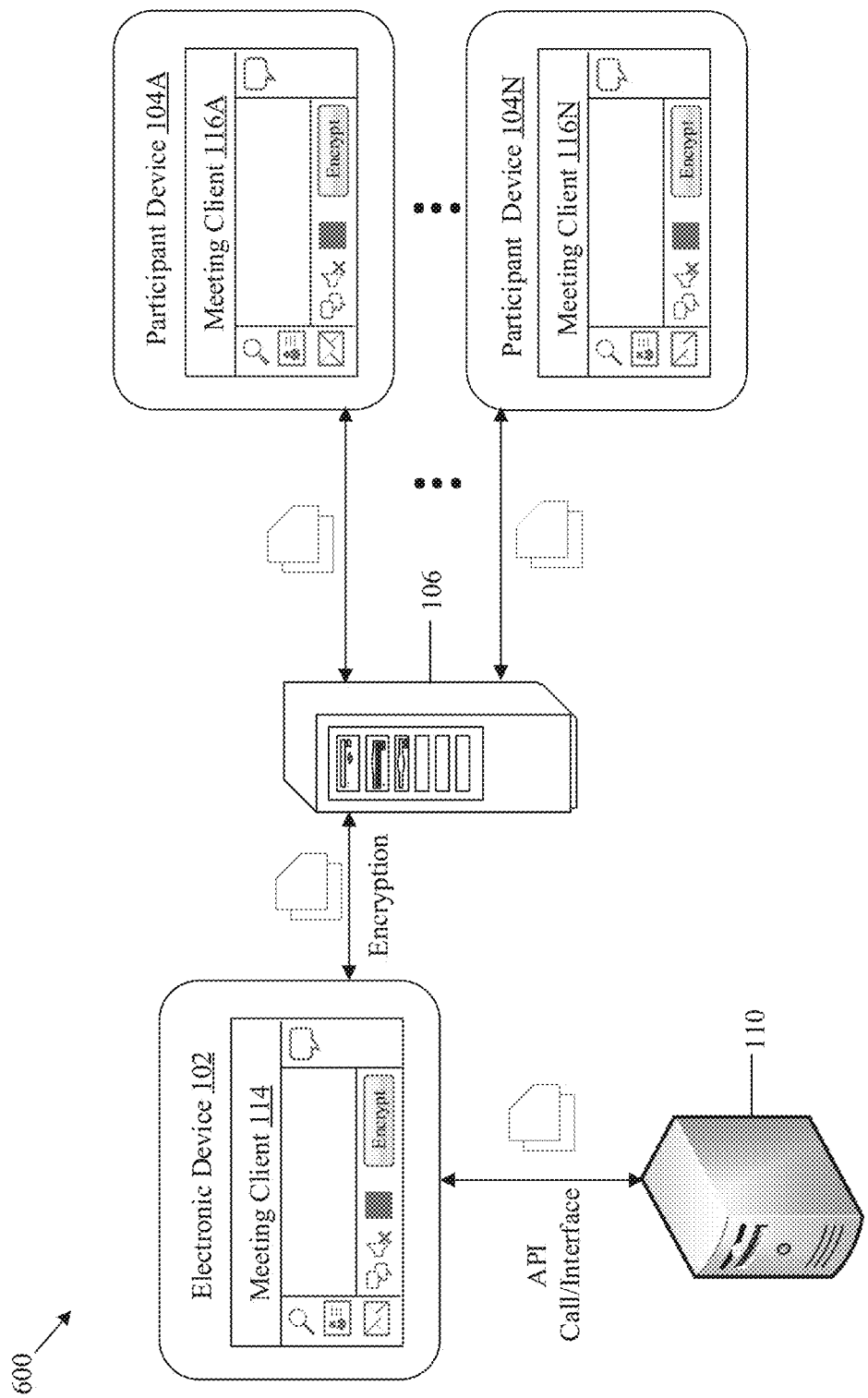
FIG. 6 is a diagram that illustrates an exemplary network environment for client-side encryption of a received transcript of a meeting audio associated with a virtual meeting session, in accordance with an embodiment of the disclosure.

FIG. 6 is a diagram that illustrates an exemplary network environment for client-side encryption of a received transcript of a meeting audio associated with a virtual meeting session, in accordance with an embodiment of the disclosure. FIG. 6 is explained in conjunction with elements from FIG. 1, FIG. 2, FIG. 3, FIG. 4A, FIG. 4B, and FIG. 5. With reference to FIG. 6, there is shown exemplary network environment 600. In the exemplary network environment 600, there is shown one or more components of FIG. 1, such as the electronic device 102, the one or more participant devices 104A ... 104N, the meeting server 106, and the $3^{rd}$ party server 110.

At any time-instant in the duration of the virtual meeting session, the electronic device 102 may be configured to record a meeting audio on the electronic device 102. By way of example, the electronic device 102 may receive a user input from the participant 118 via the UI of the meeting client 114 (on the fifth button 414A). The recording of the meeting audio may be initiated based on the received input from the participant 118 (or one or more indications from the one or more participant devices 104A ... 104N).

The electronic device 102 may be further configured to transmit a request to the $3^{rd}$ party server 110 for a transcription of the recorded meeting audio. Along with the request, the electronic device 102 may transfer the recorded meeting audio to the $3^{rd}$ party server 110 without encrypting the recorded meeting audio. Since the electronic device 102 may consider the $3^{rd}$ party server 110 as a trusted entity, the request may be transmitted to the $3^{rd}$ party server 110 and not to the meeting server 106. In an embodiment, the request may be an API call to the $3^{rd}$ party server 110.

The electronic device 102 may be further configured to receive a transcript of the meeting audio from the $3^{rd}$ party server 110. The first content may include the transcript of the meeting audio. The $3^{rd}$ party server 110 may utilize Speech-to-Text (STT) techniques to generate the transcript of the meeting audio. Such techniques may utilize software and speech recognition modes, such as deep neural networks to generate the transcript of the meeting audio.

Upon reception, the electronic device 102 may encrypt the transcript of the meeting audio (as part of the first content) and may transfer the encrypted transcript of the meeting audio to the meeting server 106. The meeting server 106 may transfer the encrypted transcript of the meeting audio to the one or more participant devices 104A ... 104N. The meeting server 106 may not have the keys to decrypt the encrypted transcript.

In FIG. 6, the $3^{rd}$ party server 110 has been described as capable of providing a speech transcription service. However, the $3^{rd}$ party server 110 may not be restricted in its functionality to transcription services. The services provided by the $3^{rd}$ party server 110 may include, but not limited to, execution of search queries over web, a video playback for web URL, a file download over FTP server (for example, drop box), or a summarization of content discussed in audio.

Figure 7:
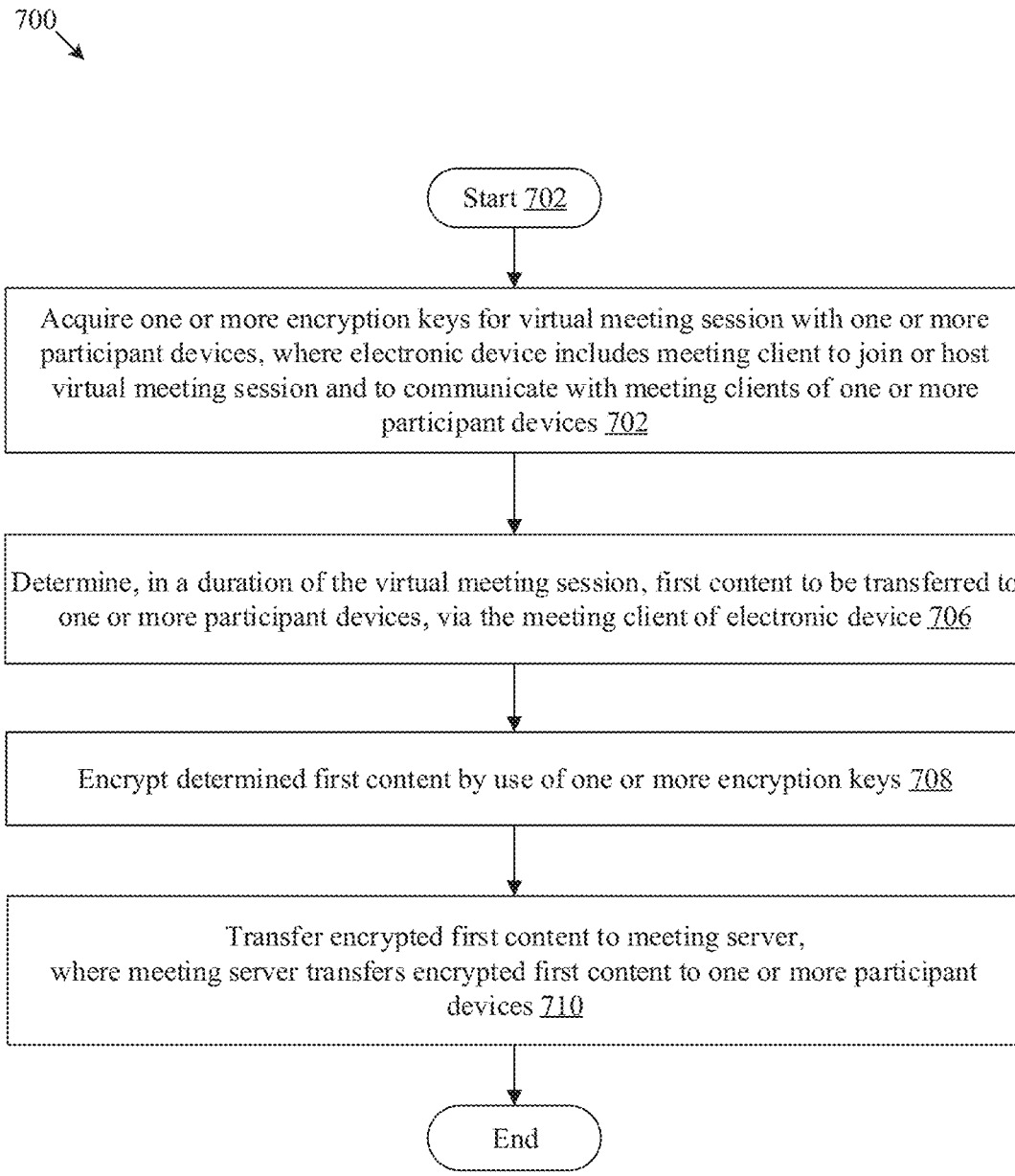
FIG. 7 is a flowchart that illustrates exemplary operations for client-side encryption of content for virtual meetings, in accordance with an embodiment of the disclosure.

FIG. 7 is a flowchart that illustrates exemplary operations for client-side encryption of content for virtual meetings, in accordance with an embodiment of the disclosure. FIG. 7 is explained in conjunction with elements from FIGS. 1, 2, 3, 4A, 4B, 5, and 6. With reference to FIG. 7, there is shown a flowchart 700. The operations from 702 to 710 may be implemented by any computing system, such as by the electronic device 102 of FIG. 1. The operations may start at 702 and may proceed to 704.

At 704, one or more encryption keys may be acquired for the virtual meeting session with one or more participant devices 104A ... 104N where the electronic device 102 may include the meeting client 114 to join or host the virtual meeting session and to communicate with the meeting clients 116A ... 116N of the one or more participant devices 104A ... 104N. In at least one embodiment, the circuitry 202 may be configured to acquire the one or more encryption keys for the virtual meeting session 116 with the one or more participant devices 104A . . . 104N.

At 706, the first content may be determined to be transferred to the one or more participant devices 104A . . . 104N in the duration of the virtual meeting session, via the meeting client 114 of the electronic device 102. In at least one embodiment, the circuitry 202 may be configured to determine, in the duration of the virtual meeting session, the first content to be transferred to the one or more participant devices 104A . . . 104N, via the meeting client 114 of the electronic device 102. The details of determination of the first content to be transferred to the one or more participant devices 104A . . . 104N, via the meeting client 114 of the electronic device 102, are described, for example, in FIGS. 4A and 4B.

At 708, the determined first content may be encrypted by use of the acquired one or more encryption keys. In at least one embodiment, the circuitry 202 may be configured to encrypt the determined first content by use of the acquired one or more encryption keys.

At 710, the encrypted first content may be transferred to the meeting server 106 where the meeting server transfers the encrypted first content to the meeting server 106. In at least one embodiment, the circuitry 202 may be configured to transfer the encrypted first content to the meeting server 106. The meeting server 106 may transfer the encrypted first content to the one or more participant devices 104A . . . 104N. Control may pass to end.

Although the flowchart 700 is illustrated as discrete operations, such as 704, 706, 708, and 710 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include acquisition of the one or more encryption keys for the virtual meeting session 116 with the one or more participant devices 104A . . . 104N. The electronic device 102 may include a meeting client 114 to join or host the virtual meeting session and to communicate with one or more meeting clients 116A . . . 116N, of the one or more participant devices 104A . . . 104N. The operations may further include determination, in the duration of the virtual meeting session, the first content to be transferred to the one or more participant devices 104A . . . 104N, via the meeting client 114 of the electronic device 102. The operations may further include encryption of the determined first content by use of the acquired one or more encryption keys. The operations may further include transfer of the encrypted first content to the meeting server 106. The meeting server 106 transfers the encrypted first content to the one or more participant devices 104A . . . 104N.

Exemplary aspects of the disclosure may include an electronic device (such as the electronic device 102 of FIG. 1) that may include circuitry (such as the circuitry 202), that may be communicatively coupled to one or more electronic devices (such as the one or more participant devices 104A . . . 104N, of FIG. 1). The electronic device 102 may further include memory (such as the memory 204 of FIG. 2). The circuitry 202 may be configured to acquire the one or more encryption keys for the virtual meeting session 116 with the one or more participant devices 104A . . . 104N. The electronic device 102 may include a meeting client 114 to join or host the virtual meeting session and to communicate with one or more meeting clients 116A . . . 116N, of the one or more participant devices 104A . . . 104N. The circuitry 202 may be further configured to determine, in the duration of the virtual meeting session, the first content to be transferred to the one or more participant devices 104A . . . 104N, via the meeting client 114 of the electronic device 102. The first content may be a part of a file transfer process, a conversation, a discussion, or a presentation in the duration of the virtual meeting session. The first content comprises a meeting audio, a textual conversation, a video recording of the virtual meeting session, a record of annotations performed by the one or more participants 120A . . . 120N, of the virtual meeting session on a type of content presented in the virtual meeting session, metadata of the virtual meeting session, or a transcript of the meeting audio recording. The circuitry 202 may be further configured to encrypt the determined first content by use of the acquired one or more encryption keys. The circuitry 202 may be further configured to transfer the encrypted first content to the meeting server 106. The meeting server 106 transfers the encrypted first content to the one or more participant devices 104A . . . 104N. The one or more encryption keys may be acquired from a key store 108 that is managed by an organization or a key issuing authority. If the key store 108 is a distributed ledger, the one or more encryption keys are stored in a first block of data on the distributed ledger.

In accordance with an embodiment, the circuitry 202 may be configured to transmit a signed transaction to the distributed ledger. The distributed ledger had executed the signed transaction on nodes associated with the distributed ledger to extract the one or more encryption keys from the first block of data. The one or more encryption keys may be acquired based on the extraction.

In accordance with an embodiment, the circuitry 202 may be further configured to acquire one or more decryption keys from the key store 108. The circuitry 202 may be further configured to receive an encrypted bit-stream from a participant device of the one or more participant devices 104A . . . 104N, in the duration of the virtual meeting session. The circuitry 202 may be further configured to decrypt the encrypted bit-stream by use of the acquired one or more decryption keys to output second content. The circuitry 202 may be further configured to control the meeting client 114 of the electronic device 102 to render the second content. The key store 108 that may be managed by an organization or a key issuing authority. If the key store 108 is a distributed ledger, the one or more decryption keys may be stored in a second block of data on the distributed ledger. The one or more encryption keys and the one or more decryption keys may be acquired before a start of the virtual meeting session.

In accordance with an embodiment, the circuitry 202 may be further configured to detect an event in the duration of the virtual meeting session based on analysis of meeting-related content associated with the virtual meeting session. The first content is determined to be a portion of the meeting-related content and corresponds to the detected event. The event corresponds to one of an indication, a watermark, a keyword, a beacon, or a timestamp that is included in the meeting-related content and is rendered on the meeting client 114 of the electronic device 102. The event is detected further based on application of the AI model 210 on the meeting-related content. The circuitry 202 may be further configured to receive, via a UI element of the meeting client 114, at least one input in the duration of the virtual meeting session from a participant device of the one or more participant devices 104A . . . 104N. The event is detected further based on the at least one input.

In accordance with an embodiment, the circuitry 202 may be further configured to determine a network bandwidth of a participant device of the one or more participant devices 104A . . . 104N, in the duration of the virtual meeting session. The circuitry 202 may be further configured to generate bitrate-specific versions of the first content. The circuitry 202 may be further configured to select a bit rate-specific version of the generated bitrate-specific versions based on the network bandwidth. The circuitry 202 may be further configured to encrypt the selected bitrate specific version of the first content by use of the one or more encryption keys. The circuitry 202 may be further configured to transfer the encrypted bitrate specific version of the first content to the meeting server 106. The meeting server 106 may transfer the encrypted bitrate specific version of the first content to the participant device.

In accordance with an embodiment, the circuitry 202 may be further configured to record a meeting audio on the electronic device 102 in the duration of the virtual meeting session. The circuitry 202 may be further configured to transmit a request to the 3$^{rd}$ party server 110 for a transcription of the recorded meeting audio. The circuitry 202 may be further configured to receive a transcript of the meeting audio from the 3$^{rd}$ party server 110. The first content includes the transcript.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
   circuitry configured to:
   acquire at least one encryption key for a virtual meeting session with at least one participant device, wherein the electronic device includes a first meeting client to join or host the virtual meeting session and to communicate with a plurality of second meeting clients of the at least one participant device;
   detect, in a duration of the virtual meeting session, an event based on analysis of a meeting-related content associated with the virtual meeting session, wherein the detected event corresponds to a first content transferred to the at least one participant device, via the first meeting client of the electronic device;
   generate bitrate-specific versions of the first content;
   determine a network bandwidth of a participant device of the at least one participant device in the duration of the virtual meeting session;
   select a bitrate-specific version of the generated bitrate-specific versions based on the network bandwidth;
   encrypt the selected bitrate-specific version of the first content by use of the at least one encryption key; and
   transfer the encrypted bitrate-specific version of the first content to a meeting server,
   wherein the meeting server transfers the encrypted bitrate-specific version of the first content to the at least one participant device.

2. The electronic device according to claim 1, wherein the first content is part of one of a file transfer process, a conversation, a discussion, or a presentation in the duration of the virtual meeting session, and
   the first content comprises one of a meeting audio, a textual conversation, a video recording of the virtual meeting session, a record of annotations performed by the at least one participant device of the virtual meeting session on a type of content presented in the virtual meeting session, metadata of the virtual meeting session, or a transcript of the meeting audio recording.

3. The electronic device according to claim 1, wherein the circuitry is further configured to acquire the at least one encryption key from a key store manageable by an organization or a key issuing authority.

4. The electronic device according to claim 1, wherein the at least one encryption key is stored in a first block of data on a distributed ledger.

5. The electronic device according to claim 4, wherein
   the circuitry is further configured to transmit a signed transaction to the distributed ledger,
   the distributed ledger executes the signed transaction on nodes associated with the distributed ledger to extract the at least one encryption key from the first block of data, and
   the at least one encryption key is acquired based on the extraction.

6. The electronic device according to claim 1, wherein the circuitry is further configured to:
   acquire at least one decryption key from a key store;
   receive an encrypted bit-stream from a participant device of the at least one participant device in the duration of the virtual meeting session;
   decrypt the encrypted bit-stream by use of the acquired at least one decryption key to output second content; and
   control the first meeting client of the electronic device to render the second content.

7. The electronic device according to claim 6, wherein the key store is managed by an organization or a key issuing authority.

8. The electronic device according to claim 6, wherein the at least one decryption key is stored in a second block of data on a distributed ledger.

9. The electronic device according to claim 6, wherein the at least one encryption key and the at least one decryption key are acquired before a start of the virtual meeting session.

10. The electronic device according to claim 1, wherein the first content is a portion of the meeting-related content.

11. The electronic device according to claim 1, wherein the event corresponds to one of an indication, a watermark, a keyword, a beacon, or a timestamp included in the meeting-related content and is rendered on the first meeting client of the electronic device.

12. The electronic device according to claim 1, wherein the circuitry is further configured to detect the event based on application of an Artificial Intelligence (AI) model on the meeting-related content.

13. The electronic device according to claim 1, wherein the circuitry is further configured to:
  receive, via a user interface element of the first meeting client, at least one input in the duration of the virtual meeting session from a participant device of the at least one participant device, and
  detect the event based on the at least one input.

14. The electronic device according to claim 1, wherein the circuitry is further configured to:
  record a meeting audio on the electronic device in the duration of the virtual meeting session;
  transmit a request to a server that is different from the meeting server for a transcription of the recorded meeting audio; and
  receive, from the server, a transcript of the meeting audio, wherein the first content includes the transcript.

15. A method, comprising:
  in an electronic device:
    acquiring at least one encryption key for a virtual meeting session with at least one participant device, wherein the electronic device includes a first meeting client to join or host the virtual meeting session and to communicate with a plurality of second meeting clients of the at least one participant device;
    detecting, in a duration of the virtual meeting session, an event based on analysis of a meeting-related content associated with the virtual meeting session, wherein the detected event corresponds to a first content transferred to the at least one participant device, via the first meeting client of the electronic device;
    generating bitrate-specific versions of the first content;
    determining a network bandwidth of a participant device of the at least one participant device in the duration of the virtual meeting session;
    selecting a bitrate-specific version of the generated bitrate-specific versions based on the network bandwidth;
    encrypting the selected bitrate-specific version of the first content by use of the at least one encryption key; and
    transferring the encrypted bitrate-specific version of the first content to a meeting server, wherein the meeting server transfers the encrypted bitrate-specific version of the first content to the at least one participant device.

16. The method according to claim 15, wherein the at least one encryption key is stored in a first block of data on a distributed ledger.

17. The method according to claim 16, further comprising:
  transmitting a signed transaction to the distributed ledger, wherein the distributed ledger executes the signed transaction on nodes associated with the distributed ledger to extract the at least one encryption key from the first block of data, and
  acquiring the at least one encryption key based on the extraction.

18. The method according to claim 15, further comprising:
  acquiring at least one decryption key from a key store;
  receiving an encrypted bit-stream from a participant device of the at least one participant device in the duration of the virtual meeting session;
  decrypting the encrypted bit-stream by use of the acquired at least one decryption key to output second content; and
  controlling the first meeting client of the electronic device to render the second content.

19. A non-transitory computer-readable medium having stored thereon, computer-executable instructions that when executed by an electronic device, causes the electronic device to execute operations, the operations comprising:
  acquiring at least one encryption key for a virtual meeting session with at least one participant device, wherein the electronic device includes a first meeting client to join or host the virtual meeting session and to communicate with a plurality of second meeting clients of the at least one participant device;
  detecting, in a duration of the virtual meeting session, an event based on analysis of a meeting-related content associated with the virtual meeting session, wherein the detected event corresponds to a first content transferred to the at least one participant device, via the first meeting client of the electronic device;
  generating bitrate-specific versions of the first content;
  determining a network bandwidth of a participant device of the at least one participant device in the duration of the virtual meeting session;
  selecting a bitrate-specific version of the generated bitrate-specific versions based on the network bandwidth;
  encrypting the selected bitrate-specific version of the first content by use of the at least one encryption key; and
  transferring the encrypted bitrate-specific version of first content to a meeting server, wherein the meeting server transfers the encrypted bitrate-specific version of first content to the at least one of participant device.

* * * * *